United States Patent [19]
Krumbach

[11] 3,992,699
[45] Nov. 16, 1976

[54] FIRST-IN/FIRST-OUT DATA STORAGE SYSTEM

[75] Inventor: Guenter F. Krumbach, Huntington Beach, Calif.

[73] Assignee: Communication Manufacturing Company, Long Beach, Calif.

[22] Filed: Nov. 13, 1974

[21] Appl. No.: 523,335

[52] U.S. Cl. .................. 340/172.5; 340/173 RC
[51] Int. Cl.² .................. G11C 19/00; G11C 21/00
[58] Field of Search .................. 340/172.5, 173 RC; 307/221 R; 178/DIG. 3

[56] References Cited
UNITED STATES PATENTS

| | | | |
|---|---|---|---|
| 3,501,746 | 3/1970 | Vosbury | 340/172.5 |
| 3,611,303 | 10/1971 | Serracchioli | 340/172.5 |
| 3,636,519 | 1/1972 | Heath | 340/172.5 |
| 3,742,466 | 6/1973 | Hamm | 340/172.5 |
| 3,755,788 | 8/1973 | Finch | 340/172.5 |
| 3,760,382 | 9/1973 | Itoh | 340/172.5 |
| 3,771,140 | 11/1973 | Tromp | 340/172.5 |
| 3,829,843 | 8/1974 | Cichetti, Jr. | 340/172.5 |

*Primary Examiner*—Gareth D. Shaw
*Assistant Examiner*—James D. Thomas
*Attorney, Agent, or Firm*—Christie, Parker & Hale

[57] ABSTRACT

A first-in/first-out memory device has a shift register with a storage capacity of n stages in which data units can be stored, and a modulo-n address counter having one state representing each stage of the shift register. In one embodiment designed for fast data storage, a data unit is transferred to the input of the shift register, during a write mode, and the state of the address counter is advanced for each data unit so transferred; during a read mode, data units are recirculated from the output of the shift register to its input, the shift register is shifted $n$ times, the state of the address counter is advanced $n - 1$ times, and the data unit appearing at the output of the shift register when the address counter state represents an empty shift register is retrieved. In another embodiment designed for fast data retrieval, a data unit is retrieved from the output of the shift register during a read mode and the state of the address counter is advanced for each data unit so transferred; during a write mode, data units are recirculated from the output of the shift register to its input, the shift register is shifted n times, the state of the address counter is advanced $n - 1$ times, and a data unit is stored in the input of the shift register when the address counter state represents a full shift register.

30 Claims, 4 Drawing Figures

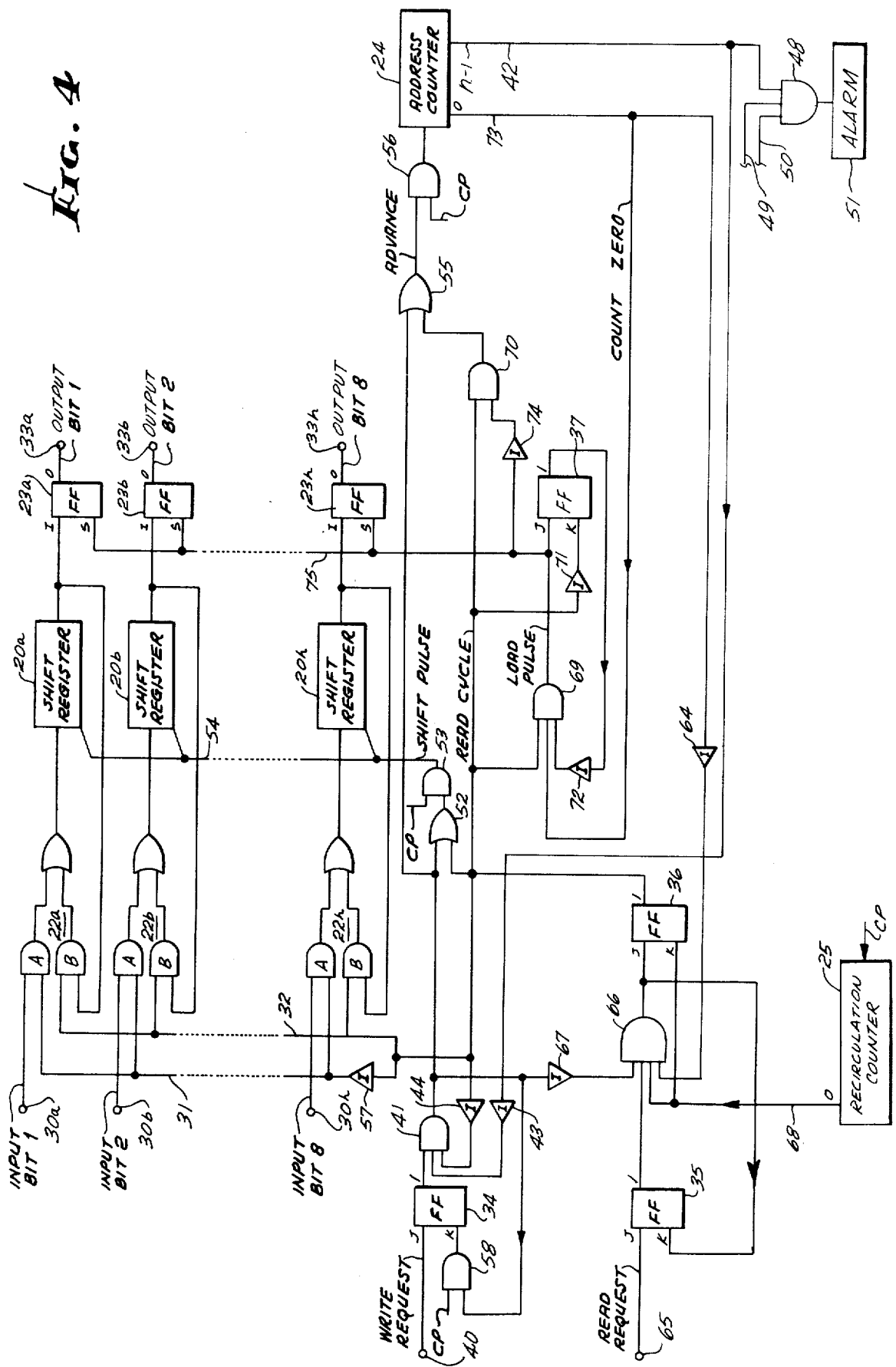

FIRST-IN/FIRST-OUT DATA STORAGE SYSTEM

BACKGROUND OF THE INVENTION

This invention relates to binary data storage and, more particularly, to a first-in/first-out (FIFO) memory device employing low cost circuit components.

In data processing operations, buffer storage is used to compensate for a different rate of data flow between two components or a different time of occurrence of receipt and utilization of data. Data is stored in a buffer on a first-in/first-out basis. In other words, the data stored in the buffer for the longest period of time is always retrieved first.

A first-in/first-out data storage system can be implemented with random access memory units or with shift register memory units. Random access units are more expensive then shift register units but provide fast access to the data storage locations.

SUMMARY OF THE INVENTION

According to the invention, a first-in/first-out memory device is implemented with shift register units in such a manner as to provide fast access for either data storage or retrieval.

The memory device has a shift register with a storage capacity of $n$ stages in which data units can be stored, and a modulo-n, unidirectional address counter having one state representing each stage of the shift register. Such a shift register and counter are low cost components. The state of the counter indicates the number of stages of the shift register in which data units are stored. In a first state, an input switch transfers data units from an input circuit to the input of the shift register, and in a second state the input switch recirculates data units from the output of the shift register to the input of the shift register. In a first state, an output switch transfers data units from the output of the shift register to an output circuit, and in a second state the output switch recirculates data units from the output of the shift register to the input of the shift register. During one mode, i.e., either a read mode or a write mode, one of the switches is placed in the first state to transfer data units, the data units stored in the shift register are shifted one stage, and the address counter is advanced one state for each data unit transferred during the mode. During the other mode, the other switch is placed in the first state when the address counter is in a given state representing a limit of data unit occupancy of the shift register and is placed in the second state when the address counter is in the other states representing shift register stages in which data units are stored, the shift register is shifted $n$ times, and the address counter is advanced $n - 1$ times for each data unit transferred.

A feature of the invention is logic circuitry for coordinating requests to enter the read mode and the write mode. When a request to enter one mode is received during the operation of the other mode, it is held until the operation in the other mode is completed, after which the requested mode is entered.

In one embodiment, fast access is provided for data storage. The last data unit placed in the shift register is located at its input, and the remaining data units in the shift register are displaced from its input in successive stages corresponding to the time sequence of placement of such data units in the shift register. In the write mode, a new data unit is transferred to the input of the shift register, as the data units stored in the shift register are shifted one stage. In the read mode, the data units stored in the shift register are shifted $n$ stages each time a data unit is to be retrieved; a data unit is transferred from the output of the shift register to the output circuit when the first data unit placed in the shift register is shifted to its output and thereafter the successive data units are recirculated to the input of the shift register so the last data unit placed in the shift register is again located at its input.

In another embodiment, fast access is provided for data retrieval. The first data unit placed in the shift register is located at its output, and the remaining data units in the shift register are displaced from its output in successive stages corresponding to the time sequence of placement of such data units in the shift register. In the read mode, a data unit is retrieved from the shift register output, as the data units stored in the shift register are shifted one stage. In the write mode, the data units stored in the shift register are shifted $n$ stages each time a data unit is to be retrieved and the shifted data units are recirculated to the input of the shift register; a new data unit is transferred to the shift register input after the last data unit placed in the shift register has recirculated to the input of the shift register.

BRIEF DESCRIPTION OF THE DRAWINGS

The features of specific embodiments of the best mode contemplated of carrying out the invention are illustrated in the drawings, in which:

FIG. 4 is a detailed logic diagram implementing the embodiment of FIG. 2.

DETAILED DESCRIPTION OF THE SPECIFIC EMBODIMENTS

Figure 1:
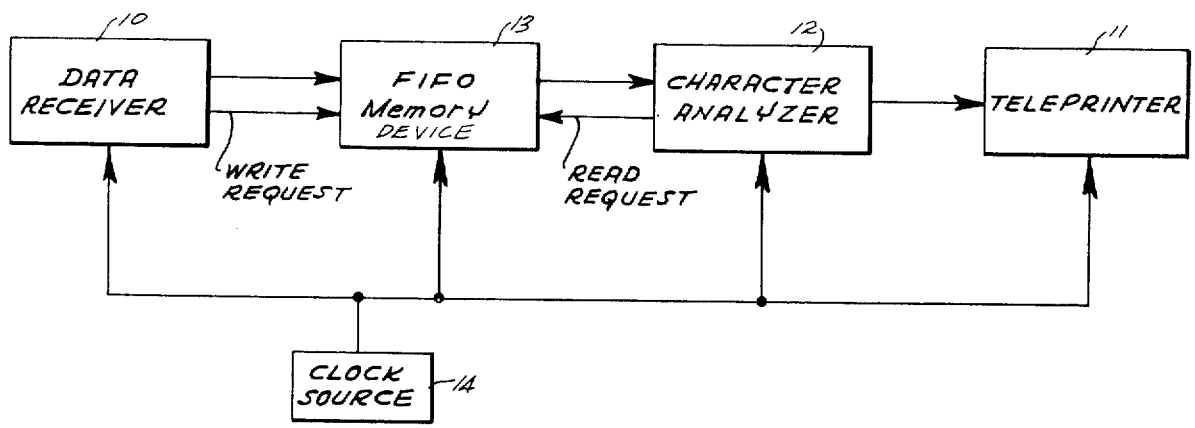
FIG. 1 is a schematic block diagram of an advantageous application of a first-in/first-out memory device embodying the principles of the invention.

In FIG. 1, a data receiver 10 accepts binary data generated by a data source for the purpose of driving a teleprinter 11 to produce a written, human readable record of the data. By way of example, the source of data could comprise equipment that monitors and controls a plurality of telephone central office conditions, such as status points, cable pressure points, and traffic. Units of data, each comprising one or more bits, are processed together. Such data units are sometimes designated characters or words. In connection with the description of FIG. 1, the data units will be designated characters, because that is the common terminology used with a teleprinter. A character analyzer 12 expands the abbreviated data characters accepted by data receiver 10 into a complete text of written characters that are produced on the record paper by the teleprinter in a form readable by a human attendant. Although data receiver 10 and teleprinter 11 operate at the same data rate, teleprinter 11 receives from character analyzer 12 more data characters than character analyzer 12 receives from data receiver 10. Therefore, buffer storage in the form of a first-in/first-out memory device 13 is required between data receiver 10 and character analyzer 12. Each time a data character is accepted by receiver 10, is issues a write request to memory device 13 and a data character is stored in memory device 13. Each time teleprinter 11 is ready to print another data character, character analyzer 12 issues a read request and the data character that has been in memory device 13 for the longest time is transferred to character analyzer 12. The operation of data receiver 10, teleprinter 11, character analyzer 12, and memory device 13 is controlled by a clock source 14. In this application, there must be fast access to memory device 13 for storage of data from receiver 10 so data is not lost, but slow access to memory device 13 for data retrieval is acceptable.

Figure 2:
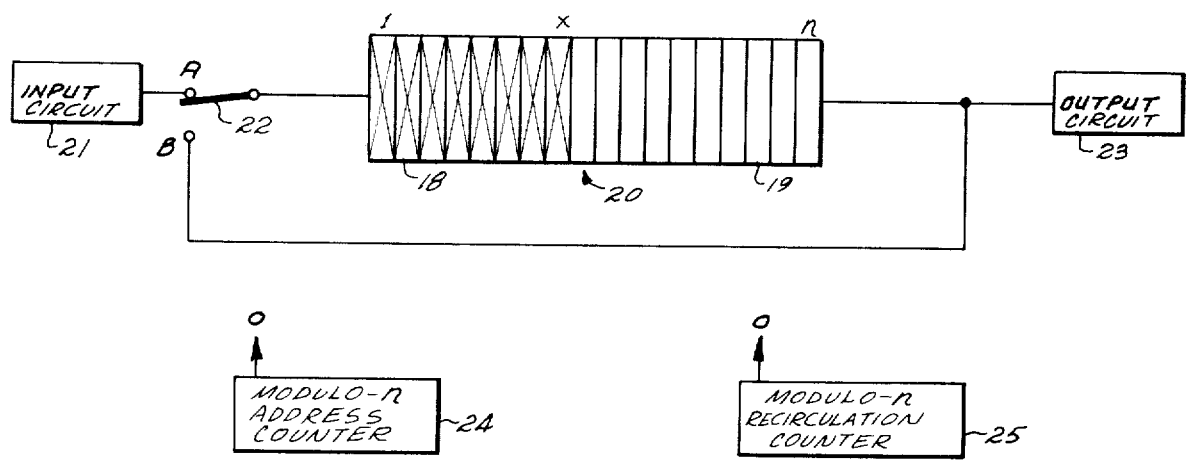
FIG. 2 is a schematic diagram of an embodiment of the invention adapted for fast access during data storage.

FIG. 2 depicts memory device 13 which is adapted for fast access during data storage and slow access during data retrieval. A shift register 20 has $n$ stages. The stages of shift register 20 storing data units are represented by vertically elongated segments filled with crosses such as that designated 18, and the stages of shift register 20 not storing data units are represented by vertically elongated segments without crosses such as that designated 19. In the specific example shown in FIG. 2, $n$ is 18, i.e., shift register 20 has 18 stages. The input stage of shift register 20 is designated 1, and the output stage of shift register 20 is designated $n$. An input circuit 21 is coupled through contact A of a switch 22 to the input stage of shift register 20, and the output stage of shift register 20 is coupled through contact B of switch 22 to the input stage of shift register 20. The output stage of shift register 20 is also directly coupled to an output circuit 23. A modulo-n address counter 24 and a modulo-n recirculation counter 25 control the operation of the memory device. Counters 24 and 25 operate unidirectionally, i.e., they only count up, not down. Counters 24 and 25 each have $n$ states. Each time a clock pulse from source 14 is supplied to counter 24 or 25, the counter advances to its next state. It is assumed address counter 24 is in state $o$ before any data units are stored in shift register 20. In other words, the memory device is empty when address counter is in state $o$. Similarly, the memory device is full when address counter is in state $n - 1$. Thus, states $o$ and $n - 1$ represent the limits of data unit occupancy of shift register 20.

In a write mode, switch 22 is positioned to close contact A. Each time a data unit is coupled from input circuit 21 to the input stage of shift register 20, the data units stored in shift register 20 are shifted one stage to the right, as viewed in FIG. 2, i.e., toward the output stage, and address counter 24 is advanced one state responsive to a clock pulse from source 14.

In a read mode, switch 22 is positioned to close contact B. Clock pulses from source 14 are applied to recirculation counter 25 until it has advanced through one complete cycle, i.e., $n$ states. Recirculation counter 25 begins and ends its cycle at state $o$. These clock pulses, $n$ in number, also shift the data units stored in shift register 20 $n$ times to the right, i.e., until these data units completely recirculate. The clock pulses from source 14 also advance address counter 24. When address counter 24 assumes its initial state designated $o$, the data shifted out of the output stage of shift register 20 is coupled to output circuit 23 for retrieval. Thereafter, the advance of address counter 24, responsive to one of the clock pulses, is inhibited so that address counter 24 advances a total of $n - 1$ states as recirculation counter 25 advances $n$ states.

In summary, the state of address counter 24 between operates in the read mode represents the stage of shift register 20, i.e., its address, in which the oldest data unit is stored. This completely defines the boundaries of the data units stored in shift register 20 because the newest data unit is always stored in the input stage and the remaining data units are displaced from the output stage in successive stages corresponding to the time sequence of storage of such data units in shift register 20. Each time a new data unit is stored in shift register 20 during the write mode, address counter 24 is advanced one state, and each time the oldest data unit in shift register 20 is retrieved during the read mode, address counter 24 is, in essence, retracted one state, i.e., advanced $n - 1$ states. Thus, during the read mode, address counter 24 serves to designate when the oldest data unit in shift register 20 is shifted out of its output stage so that it may be accepted by output circuit 23, i.e., when address counter 24 assumes its initial state, and recirculation counter 25 serves to keep track of the number of shifts of shift register 20 required to completely recirculate the data units stored therein during the read mode.

In FIG. 2, $x$ represents the stage of shift register 20 in which the oldest data unit is stored. Address counter 24 would also be in state $x$ prior to entering the read mode. In the specific example shown in FIG. 2, $x$ is 8. When address counter 24 advances to state $o$ during the read mode, the oldest data unit stored in shift register 20 is in its output stage and, therefore, ready for retrieval. Thus, when address counter 24 assumes its initial state responsive to the next clock pulse, the oldest data unit in shift register 20 shifts out of its output stage and is accepted by output circuit 23 responsive to this clock pulse. (The fact that this data unit is also recirculated to the input stage of shift register 20 is not significant because address counter 24 thereafter ignores this data until it is destroyed by a new data unit stored in its place in shift register 20.) Responsive to the following $x - 1$ clock pulses from source 14, the remaining data units stored in shift register 20 are recirculated to their initial positions illustrated in FIG. 2. The state of address counter 24 now represents that the oldest data unit in shift register 20 is stored in stage $x - 1$.

The connection of the output stage of shift register 20 to output circuit 23 and back to the input stage of shift register 20 functions as an output switch, which recirculates data units to the input of shift register 20 at all times, except when a data unit is accepted by output circuit 23. When a data unit is accepted by output circuit 23, it is in effect not recirculated to the input of shift register 20, because address counter 24 is retracted one state.

In the disclosed embodiment, the oldest data unit in shift register 20 is not transferred from its output stage to output circuit 23 until the next time shift register 20 is shifted, i.e., until address counter 24 assumes state $o$. But, the oldest data unit in shift register 20 could be transferred from its output stage to output circuit 23 any time after address counter 24 assumes state $o$, because that is when the oldest data unit becomes available at the output stage of shift register 20, up to the time address counter 24 assumes state 1, because that is when the oldest data unit shifted out of and ceases to be available at the output stage of shift register 20.

The access time of the memory device of FIG. 2 in the write mode is one clock pulse period of source 14 because storage of a data unit is accomplished by shifting shift register 20 one time. The access time of the memory device of FIG. 2 in the read mode is $n$ clock pulse periods of source 14 because retrieval of a data unit is accomplished by completely recirculating the data stored in shift register 20.

Figure 3:
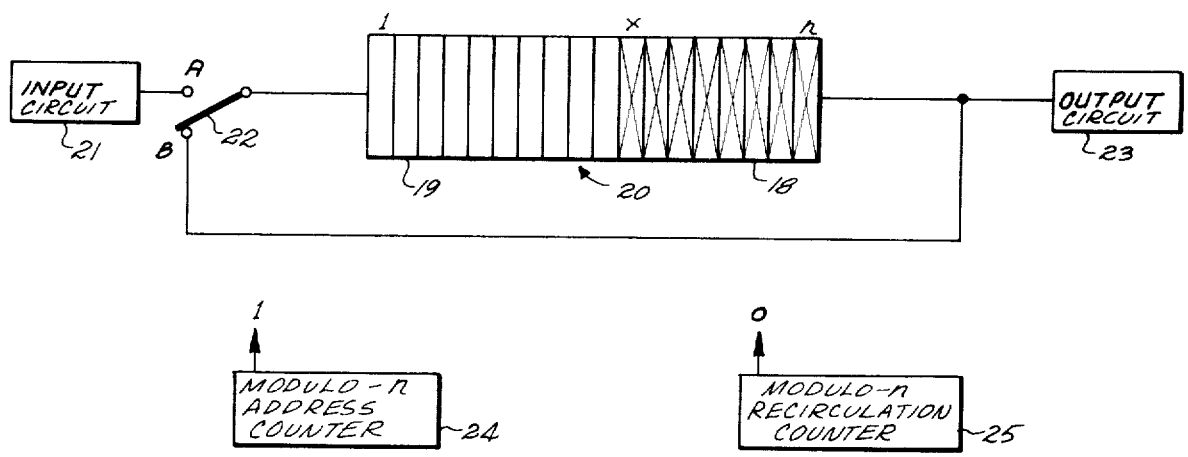
FIG. 3 is a schematic diagram of an embodiment of the invention adapted for fast access during data retrieval.

FIG. 3 depicts the components of FIG. 2 adapted for fast access during data retrieval and slow access during data storage. For ease of visualization of this embodiment it is assumed the states of address counter 24 are designated 1 through $n$. It is assumed address counter 24 is in state 1 before any data units are stored in shift register 20. In order words, the memory device is empty when address counter 24 is in state 1. Similarly, the memory device is full when address counter 24 is in state 2. Thus, states 1 and 2 represent the limits of data unit occupancy of shift register 20.

In a read mode, switch 22 is positioned to close contact B. Each time a data unit is coupled from the output stage of shift register 20 to output circuit 23, the data units stored in shift register 20 are shifted one stage to the right, as viewed in FIG. 2, i.e., toward the output stage, and address counter 24 is advanced one state responsive to a clock pulse from source 14. (The fact that this data unit is also recirculated to the input stage of shift register 20 is not significant because address counter 24 thereafter ignores this data unit it is destroyed by a new data unit stored in its place in shift register 20.)

In a write mode, switch 22 is initially positioned to close contact B. Clock pulses from source 14 are applied to recirculation counter 25 until it has advanced through one complete cycle, i.e., $n$ states. These clocks pulses $n$ in number, also shift the data units stored in shift register 20 $n$ times to the right, i.e., until these data units completely recirculate. The clock pulses from source 14 also advance address counter 24. After address counter 24 assumes state 2, switch 22 is positioned to close contact A so a data unit can be coupled from input circuit 21 to the input stage of shift register 20 upon the next shift of shift register 20. Thereafter, the advance of address counter 24, responsive to one of the clock pulses, is inhibited so that address counter 24 advances a total of $n - 1$ states as recirculation counter 25 advances $n$ states.

In summary, the state of address counter 24 between operations in the write mode represents the state of shift register 20, i.e., its address, in which the newest data unit is stored. This completely defines the boundaries of the data units stored in shift register 20 because the oldest data unit is always stored in the output stage and the remaining data units are displaced from the output stage in successive stages corresponding to the time sequence of storage of such data units in shift register 20. Each time the oldest data unit is retrieved from shift register 20 during the read mode, address converter 24 is advanced one state, and each time a new data unit is stored in shift register 20 during the write mode, address couinter 24 is, in essence, retracted one state, i.e., advanced $n - 1$ states. Thus, during the write mode, address counter 24 serves to designate when the newest data unit in shift register 20 is shifted from its input stage so that a new data unit may be accepted from input circuit 21, i.e., when address counter 24 assumes state 2, and recirculation counter 25 serves to keep track of the number of shifts of shift register 20 required to completely recirculated the data units stored therein during the write mode.

In FIG. 3, $x$ represents the stage of shift register 20 in which the newest data unit is stored. Address counter 24 would also be in state $x$ prior to entering the write mode. In the specific example shown in FIG. 3, $x$ is 11. When address counter 24 advances to state 1 write mode, the newest data unit stored in shift register 20 has recirculated into its input stage. Thus, when address counter 24 assumes state 2 responsive to the next clock pulse, the newest data unit in shift register 20 has just been shifted out of its input stage and a data unit is coupled thereto from input circuit 21. Responsive to the following $x - 2$, clock pulses from source 14, the data units stored in shift register 20 are shifted to their initial positions illustrated in FIG. 3. The state of address counter 24 now represents that the oldest data unit in shift register 20 is stored in stage $x - 1$.

The access time of the memory device of FIG. 3 in the read mode is one clock pulse period of source 14 because retrieval of a data unit accomplished by shifting shift register 20 one time. The access of the memory device of FIG. 3 in the write mode is $n$ clock pulse periods of source 14 because storage of a data unit is accomplished by completely recirculating the data stored in shift register 20.

Reference is made to FIG. 4 for a description of the circuitry for implementing the embodiment of FIG. 2. For the purpose of illustration, it is assumed that each data unit comprises eight bits, which are processed in parallel by the first-in/first-out memory device. Thus, shift register 20 is implemented by individual shift registers 20$a$ through 20$h$, i.e., eight in number, which are connected in parallel and shifted simultaneously one bit at a time. For the purpose of illustration, it is assumed that shift register 20 is to have a storage capacity of 128 data units; in such case, each of shift registers 20$a$ through 20$h$ has the capacity of 128 bits. Alternatively, the memory device could be implemented to process the data units serially, in which case a single shift register having a storage capacity of 1,024 bits shifted 8 bits at a time would be employed.

Switch 22 is implemented by individual switches 22$a$ through 22$h$ for the corresponding bits of the data unit. Each of switches 22$a$ through 22$h$ comprises an AND gate A corresponding to contact A in FIG. 2, an AND gate B corresponding to contact B in FIG. 2, and an OR gate for isolation purposes. Input terminals 30$a$ through 30$h$ are connected to one input of AND gates A of switches 22$a$ through 22$h$, respectively, to couple the bits of each data unit from input circuit 21 (not shown in FIG. 4) to shift register 20. An enabling bus 31 is connected to the other input of each of AND gates A of switches 22$a$ through 22$h$. The outputs of shift registers 20$a$ through 22$h$ are connected to one input of AND gates B of switches 22$a$ through 22$h$, respectively, to recirculated data units through shift register 20. An enabling bus 32 is connected to the other input of each of AND gates B of switches 22$a$ through 22$h$. The outputs of each of AND gates A and each of AND gates B are connected to the inputs of the OR gate of switches 22$a$ through 22$h$, and their outputs are connected to the inputs of shift registers 20$a$ through 22$h$, respectively.

Outputs circuit 23 is implemented by individual delay flip-flops 23$a$ through 23$h$, which each function as a single stage shift register. Flip-flops 23$a$ through 23$h$ each have an input terminal designated I, an output terminal designated O, and a shifting terminal designated S. Upon the application of a pulse to terminal S, the output of each delay flip-flop assumes the binary state of the signal applied to the terminal I thereof. The outputs of shift registers 20a through 20h are connected to terminals I of flip-flops 23a through 23h, respectively, and terminals O of flip-flops 23a through 23h, respectively, are connected to output terminals 33a through 33h, respectively.

A write request flip-flop 34, a read request flip-flop 35, a read-cycle control flip-flop 36, and a recirculation flip-flop 37 are provided. Flip-flops 34 through 37 are each J-K flip-flops, having a J input, a K input, a "1" output, and a "O" output, which is not utilized. When the J input of the flip-flop is energized, the "1" output is energized, and when the K input of the flip-flop is energized the "1" output is deenergized. Flip-flops 34 through 37 also have a clock input not shown to which the clock pulses from source 14 are applied to snychronize the operation of the flip flops.

Write requests from data receiver 10 are coupled via to terminal 40 to the J input of flip-flop 34. The "1" output of flip-flop 34 is directly connected to one input of an AND gate 41. A lead 42 of address counter 24, which is energized when counter 24 is in state $n-1$, is coupled through an inverter 43 to another input of AND gate 41. The one output of flip-flop 36 is coupled through an inverter 44 to a third input of AND gate 41.

Lead 42 is directly coupled to one input of an AND gate 48, the "1" output of flip-flop 34 is coupled to another input of AND gate 48 via a lead 49, and the output of inverter 44 is coupled to a third input of AND gate 48 via a lead 50. The output of AND gate 48 is connected to an alarm 51. The "1" output of flip-flop 36 is energized while the memory device is operating in the read mode. When address counter 24 is in state $n-1$ between operations in the read mode, the memory device is full of data units and any further attempts to store data units therein will result in the destruction of data which has not yet been retrieved. When a write request is issued by data receiver 10, the J input of flip-flop 34 is energized. If address counter 24 is in state $n-1$ and flip-flop 36 is not energized when such a write request is issued, the output of AND gate 48 becomes energized to acutate alarm 51. Thus, the attendant at the teleprinter is apprised that the memory device is full.

The output of AND gate 41 is coupled through an OR gate 52 to one input of an AND gate 53. Clock pulses, designated CP, from source 14 are applied to the other input of AND gate 53. The output of AND gate 53 is connected to a shifting bus 54, which shifts the data in shift registers 20a through 20h one stage when energized. The output of AND gate 41 is also coupled through at OR gate 55 to one input of an AND gate 56. Clock pulses are applied to the other input of AND gate 56 and its output is connected to address counter 24 to advance its state. The output of AND gate 41 is also connected to one input of an AND gate 58 to the other input of which clock pulses are applied. The output of AND gate 58 is connected to the K input of flip-flop 34. The one output of flip-flop 36 is coupled through an inverter 57 to enabling bus 31. Each time data receiver 10 issues a write request when the memory device is not operating in the read mode and is not full, the output of AND gate 41 is energized; a shift pulse is applied to bus 54 to shift the data units stored in shift register 20 one stage; bus 31 is energized to transmit the bits of the data unit applied to input terminals 30a through 30h to the input of shift registers 20a through 20h, respectively, via AND gate A of switches 22a through 22h, respectively; the output of AND gate 56 is energized to advance address counter 24 one state; and the output of AND gate 58 is energized to deenergized the "1" output of flip-flop 34.

When data receiver 10 issues a write request while the memory device is operating in the read mode, the energization of the output of AND gate 41 is delayed until the read operation is completed and the "1" output of flip-flop 36 becomes deenergized. Thus, flip-flop 34 serves to store the write request until the read operation in progress is completed.

Read requests from character analyzer 12 are coupled to the J input of flip-flop 35 via an input terminal 65. The one output of flip-flop 35 is connected to an input of an AND gate 66. The output of AND gate 41 is coupled through an inverter 67 to another input of AND gate 66. A lead 73, which becomes energized when address counter 24 is in state $o$, is coupled through an inverter 64 to another input of AND gate 66 to prevent operation in the read mode when the memory device is empty. A lead 68, which becomes energized when recirculation counter 25 is in state $o$, is connected to a third input of AND gate 66, and to the K input of flip-flop 36. In the disclose implementation, clock pulses are continually applied to recirculation counter 25 so it advances through its states even when reading and writing operations are not in progress, because counter 25 is also employed for other timing purposes in connection with the data processing operation disclosed in FIG. 1. The output of AND gate 66 is connected to the J input of flip-flop 36 and to the K input of flip-flop 35. THe "1" output of flip-flop 36 is coupled through OR gate 52 to AND gate 53.

When character analyzer 12 issues a read request, the J input of flip-flop 35 is energized. If the memory device is not operating in the write mode and is not empty when recirculation counter 25 thereafter assumes state o, the output of AND gate 66 is energized and the "1" output of flip-flop 36 becomes energized, to begin the cycle in the read mode. The "1" output of flip-flop 36 remains energized until counter 25 advances through its complete cycle and returns again to state $o$, a total of $n$ clock pulse periods.

The output of AND gate 66 is also connected to the K input of flip-flop 35 to deenergize the "1" output of flip-flop 35 when the output of AND gate 66 is energized. The memory device gives preference to write requests over read requests. Flip-flop 35 serves to store the read requests issued by character analyzer 12 until such time as the memory device is not operating in a write mode when recirculation counter 25 assumes its O state $o$. Then, the output of AND gate 66 becomes energized, the "1" output of flip-flop 36 becomes energized, and the "1" output of flip-flop 35 becomes deenergized, to insure that no data units are lost by failure of the memory device to respond to successive read requests.

During the cycle of the read mode, the output of AND gatae 53 is energized $n$ times to produce $n$ shift pulses on shifting bus 54. As a result, the data units stored in shift registers 20a through 20h recirculate one complete time. The "1" output of flip-flop 36 is directly connected to an input of an AND gate 69, directly connected to an input of AND gate 70, and connected through an inverter 71 to the K input of flip-flop 37. The "1" output of flip-flop 37, which is initially deenergized, is connected through an inverter 72 to another input of AND gate 69. A lead 73, which is energized when address counter 24 assumes state *o*, is connected to a third input of AND gate 69. The output of AND gate 69 is directly connected to the J input of flip-flop 37, directly connected by a shifting bus 75 to the S inputs of flip-flops 23*a* through 23*h*, and connected through an inverter 74 to the other input of AND gate 70. While the "1" output of flip-flop 36 is energized and the output of AND gate 69 is not energized, the output of AND gate 70 is energized, and clock pulses are applied to address counter 24 to advance its state. When address counter 24 assumes state *o*, i.e., when the oldest data unit stored in shift register 20*a* through 20*h* is being shifted out of the output thereof, lead 73 becomes energized to produce at the output of AND gate 69 a load pulse. The load pulse shifts flip-flops 23*a* through 23*h* to store this data unit therein, energizes the "1" output of flip-flop 37, which prevents further energization of the output of AND gate 69, and deenergizes the output of AND gate 70 for one clock pulse period, thereby inhibiting the advance of address counter 24 in response to one of the clock pulses from source 14. Thus, address counter 24 advances *n* - 1 states during the cycle of the read mode. At the end of the read mode when the "1" output of flip-flop 36 becomes deenergized, the K input of flip-flop 37 becomes energized to reset flip-flop 37 for the next read request.

The embodiment of FIG. 3 is implemented in a manner analogous to the embodiment of FIG. 2. However, read requests would be applied to input terminal 40, writer requests would be applied to input terminal 65, and leads 42 and 73 would be energized when address counter 24 is in states 1 and 2, respectively.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. Thus, although the invention has been described in connection with the storage and retrieval of data units on an individual basis, it could also be employed to store and retrieve blocks of data units during each read and write mode with modification of the control circuitry disclosed in FIG. 4. For example, the memory device could accept an entire block of data from the output of a digital computer at a very fast rate in the write mode, namely, one data unit of the block for each shift of the shift register, and then deliver this block of data to a teleprinter at a slower rate in the read mode, namely, one data unit of the block for each recirculation through the shift register. Conversely, employing the embodiment of FIG. 3, a memory device could accept a block of data units at a slow rate from a manual keyboard device in the write mode and deliver the block of data to the input of a computer in a read mode at a fast rate. In such cases, the read and write modes could be operated under the control of a common clock source as disclosed in the specific embodiments herein, or under the control of separate, unsynchronized clock sources of the devices connected by the memory device. For example, the computer clock could be employed in the mode receiving data from, or transmitting data to, it and the clock of the keyboard device or teleprinter could be employed to transmit data to, or receive data from, it.

It should be noted that counters 24 and 25 are unidirectional, i.e., they count up, but not down. Unidirectional counter and shift registers are inexpensive components in comparison to random access memories.

What is claimed is:

1. A first-in/first-out data storage system alternatively operating in a read mode and a write mode, the system comprising:
    a shift register having a storage capacity of *n* stages in which data units can be stored;
    a modulo-n address counter having one state of representing each stage of the shift register, the state of the address counter between operations indicating the number of stages of the shift register in which data units are stored;
    an input circuit;
    an output circuit;
    input switching means to transfer data units from the input circuit to the input of the shift register in a first state and to recirculate data units from the output of the shift register to the input of the shift register in a second state;
    output switching means to transfer data units from the output of the shift register to the output circuit in a first state and to recirculate data units from the output of the shift register to the input of the shift register in a second state;
    means during the write mode for placing the input switching means in the first state to transfer data units;
    means for shifting the data units stored in the shift register one stage and advancing the address counter one state for each data unit transferred during the write mode;
    means during the read mode for placing the output switching means in the first state after the address counter is in a given state representing an empty shift register, and placing the output switching means in the second state after the address counter is in the other states representing shift register stages in which data units are stored; and
    means for shifting the shift register *n* times and advancing the address counter *n* - 1 times for each data unit transferred during the read mode.

2. The system of claim 1, additionally comprising a first source of signals assuming a given output state to indicate a request to enter the one mode, a second source of signals assuming a given output state to indicate a request to enter the other mode, means responsive to the given output state of the first source for entering the one mode, means responsive to the given output state of the second source while the first source is not in its given output state for entering the other mode, and means responsive to the given output state of the second source while the first source is in its given output state for delaying the entrance to the other mode.

3. The system of claim 2, additionally comprising a third source of signals assuming a given output state to indicate operation of the system in the other mode, the means for entering the one mode including means while the third source is in the given output state for delaying the entrance to the one mode.

4. The system of claim 3, in which the one mode is the write mode and the other mode is the read mode, the one switching means is the input switching means and the other switching means is the output switching means, and the given state represents an empty shift register.

5. The system of claim 1, in which the means for shifting the shift register $n$ times and advancing the address counter $n - 1$ times comprises a modulo-n recirculation counter having one state representing each stage of the shift register, a source of clock pulses, means during the other mode for advancing the recirculation counter responsive to the clock pulses, means for shifting the shift register responsive to each clock pulse until the recirculation counter advances through one complete cycle, and means for advancing the address counter responsive to each and every clock pulse until the address counter responsive to only one of the clock pulses.

6. The system of claim 5, additionally comprising a first source of signals assuming a given output state to indicate a request to enter the one mode, a second source of signals assuming a given output state to indicate a request to enter the other mode, means responsive to the given output state of the first source for entering the one mode, means responsive to the given output state of the second source while the first source is not in its given output state for entering the other mode, and means responsive to the given output state of the second source while the first source is in its given output state for delaying the entrance to the other mode.

7. The system of claim 6, additionally comprising a third source of signals assuming a given output state to indicate operation of the system in the other mode, the means for entering the one mode including means while the third source is in the given output state for delaying the entrance to the one mode.

8. The system of claim 7, additionally comprising means responsive to the address counter when the state of the address counter indicates data units are stored in $n - 1$ stages of the shift register for preventing transfer of data units from the input circuit to the input of the shift register.

9. The system of claim 8, additionally comprising an alarm and means responsive to the address counter when the state of the address counter indicates data units are stored in $n - 1$ stages of the shift register for actuating the alarm.

10. The system of claim 9, additionally comprising means responsive to the address counter when the state of the address counter indicates no data units are stored in the shift register for preventing the transfer of data units from the output of the shift register to the output circuit.

11. The system of claim 10, in which the output circuit comprises a delay flip-flop having a shifting input, and the output switching means comprises a direct connection from the output of the shift register to the delay flip-flop and means for energizing the shifting input of the delay flip-flop when the output switching means is in the first state.

12. The system of claim 11, in which the means for placing the other switching means in the first state places the other switching means in the first state upon the next shift of the shift register occurring after the address counter is in the given state.

13. The system of claim 5, in which the output circuit comprises a delay flip-flop having a shift input, and the output switching means comprises a direct connection from the output of the shift register to the delay flip-flop and means for energizing the shifting input of the delay flip-flop when the output switching means is in the first state.

14. The system of claim 13, in which the means for placing the other switching means in the first state places the other switching means in the first state upon the next shift of the shift register occurring after the address counter is in the given state.

15. The system of claim 1, additionally comprising means responsive to the address counter when the state of the address counter indicates data units are stored in $n - 1$ stages of the shift register for preventing transfer of data units from the input circuit to the input of the shift register.

16. The system of claim 1, additionally comprising an alarm and means responsive to the address counter when the state of the address counter indicates data units are stored in $n - 1$ stages of the shift register for actuating the alarm.

17. The system of claim 1, additionally comprising means responsive to the address counter when the state of the address counter indicates no data units are stored in the shift register for preventing the transfer of data units from the output of the shift register to the output circuit.

18. The system of claim 1, in which the output circuit comprises a delay flip-flop having a shifting input, and the output switching means comprises a direct connection from the output of the shift register to the delay flip-flop and means for energizing the shifting input of the delay flip-flop when the output switching means is in the first state.

19. The system of claim 1, in which the means for placing the other switching means in the first state places the other switching means in the first state upon the next shift of the shift register occurring after the address counter is in the given state.

20. A first-in/first-out data storage system alternatively operating in a read mode and a write mode, the system comprising:
a shift register having a storage capacity of $n$ stages in which data units can be stored;
a modulo-n address counter having one state representing each stage of the shift register, the state of the address counter between operations indicating the number of stages of the shift register in which data units are stored;
an input circuit;
an output circuit;
input switching means to transfer data units from the input circuit to the input of the shift register in a first state and to recirculate data units from the output of the shift register to the input of the shift register in a second state;
output switching means to transfer data units from the output of the shift register to the output circuit in a first state and to recirculate data units from the output of the shift register to the input of the shift register in a second state;
means during the read mode for placing the output switching means in the first state to transfer data units;
means for shifting the data units stored in the shift register one stage and advancing the address counter one state for each data unit transferred during the read mode;
means during the write mode for placing the input switching means in the first state the address counter is in a given state representing a full shift register, and placing the input switching means in the second state after the address counter is in the other states representing shift register stages in which data units are stored; and means for shifting the shift register $n$ times and advancing the address counter $n - 1$ times for each data unit transferred during the write mode.

21. A binary data memory device from which data units are retrievable on a first-in/first-out basis, the memory device comprising:

a shift register having a storage capacity of a given number of stages in which data units can be stored, the last data unit placed in the shift register being located at the input of the shift register and the remaining data units in the shift register being displaced from the input of the shift register in successive stages corresponding to the order of placement of such data units in the shift register;

first means for shifting the data units stored in the shift register one state each time a new data unit is to be stored in the shift register;

storing means for transferring the new data unit to the input of the shift register as the first shifting means shifts;

second means for shifting the data units stored in the shift register the given number of stages each time a data unit is to be retrieved from the shift register; and retrieving means for transferring a data unit out of the output of the shift register when the first data unit placed in the shift register is at the output of the shift register and thereafter recirculating the successive data units to the input of the shift register as the second shifting means shifts, the retrieving means including an address counter having a number of states equal to the given number of stages of the shift register, one state of the address counter representing an empty shift register, means for advancing the address counter one state each time a new data unit is transferred to the input of the shift register, means as the second shifting means shifts for advancing the address counter one state for each shift until the state of the address counter represents an empty shift register and thereafter advancing the address counter one state for each shift except one, and means when the address counter assumes the state after the state representing an empty shift for transferring the data unit out of the output of the shift register.

22. The memory device of claim 21, in which the second shifting means comprises:

a source of clock pulses;

a recirculation counter having a number of states equal to the given number of the stages of the shift register;

means for advancing the state of the recirculation counter responsive to each clock pulse from the source when a data unit is to be retrieved from the shift register; and means for shifting the data units stored in the shift register until the recirculation counter advances through one complete cycle.

23. A binary data memory device from which data units are retrievable on a first-in/first-out basis, the memory device comprising:

a shift register having a storage capacity of $n$ stages in which data units are stored, the first data unit placed in the shift register being located at the output of the shift register and the remaining data units in the shift register being displaced from the output of the shift register in successive stages corresponding to the order of placement of such data units in the shift register;

first means for shifting the data units stored in the shift register one stage each time the first data unit is to be transferred out of the output of the shift register;

retrieving means for transferring the first data unit out of the output of the shift register;

second means for shifting the data units stored in the shift register $n$ stages each time a new data unit is to be placed in the shift register; and storing means for transferring the new data unit to the input of the shift register when the last data unit placed in the shift register is at the input of the shift register and prior thereto recirculating the successive data units from the output of the shift register to the input of the shift register as the shift register shifts during placement of the new data unit, the storing means including an address counter having a number of states equal to the given number of stages of the shift register, one state of the address counter representing a full shift register, means for advancing the address counter one state each time the last data unit is transferred out of the output of the shift register, means as the second shifting means shifts for advancing the address counter one state for each shift until the state of the address counter represents a full shift register and thereafter advancing the address counter one state for each shift of the shift register except one, and means when the address counter assumes the state after the state representing a full shift register for transferring the data unit into the input of the shift register.

24. The memory device of claim 23, in which the second shifting means comprises:

a source of clock pulses;

a recirculation counter having a number of states equal to the given number of the stages of the shift register;

means for advancing the state of the recirculation counter responsive to each clock pulse from the source each time a new data unit is to be stored in the shift register; and means for shifting the data units stored in the shift register until the recirculation counter advances through one complete cycle.

25. Data communication apparatus having a data receiver that generates a write request signal upon the acceptance of abbreviated data characters; a data analyzer for expanding the abbreviated data characters accepted by the data receiver one at a time into full text data characters, the data analyzer generating a read request signal after each abbreviated data character is expanded; and a teleprinter that produces written characters on paper responsive to data characters from the data analyzer; the improvement comprising a first-in/first-out memory device coupling the data receiver to the data analyzer, the memory device comprising:

a shift register having a storage capacity of a given number of stages in which data characters can be stored, the last data character placed in the shift register being located at the input of the shift register and the remaining data characters in the shift register being displaced from the input of the shift register in successive stages corresponding to the order of placement of such data characters in the shift register;

first means responsive to a write request for shifting the data characters stored in the shift register one stage each time a new data character is to be stored in the shift register;

storing means for transferring the new data character from the data receiver to the input of the shift register as the first shifting means shifts;

second means responsive to a read request for shifting the data characters stored in the shift register the given number of stages each time a data character is to be retrieved from the shift register; and retrieving means for transferring a data character from the output of the shift register to the data analyzer when the first data character placed in the shift register is at the output of the shift register and thereafter recirculating the successive data characters to the input of the shift register as the second shifting means shifts.

26. The apparatus of claim 25, additionally comprising means for storing a write request generated by the data receiver while the second means is shifting the data characters, until the second means has shifted the data characters the given number of stages.

27. The apparatus of claim 25, additionally comprising means for storing a read request generated by the character analyzer while the first means is shifting the data characters, until the storing means has transferred a new data character to the input of the shift register.

28. The apparatus of claim 27, additionally comprising a source of clock pulses, means for shifting the data characters in the shift register responsive to the respective clock pulses, recirculation counting means for giving an indication each time the given number of clock pulses occur, and means for storing a read request generated by the character analyzer until the first means is not shifting the data characters when the recirculation counting means gives an indication.

29. The apparatus of claim 25, additionally comprising means for preventing the transfer of data characters from the shift register to the character analyzer responsive to read requests when no data characters are stored in the shift register.

30. The apparatus of claim 25, additionally comprising means for preventing transfer of data characters from the data receiver to the shift register responsive to write requests when data characters are stored in all the stages of the shift register except one.

* * * * *

UNITED STATES PATENT AND TRADEMARK OFFICE
CERTIFICATE OF CORRECTION

PATENT NO. : 3,992,699

DATED : November 16, 1976

INVENTOR(S) : Guenter F. Krumbach

It is certified that error appears in the above-identified patent and that said Letters Patent are hereby corrected as shown below:

Col. 1, line 18, "then" should read --than--.

Col. 3, line 1, "ils" should read --is--; line 2, "is" should read --it--.

Col. 4, line 2, "operates" should read --operations--; line 7, "output" should read --input--; line 37, after "data" insert --unit--; line 65, after "unit" insert --is--.

Col. 5, line 27, after "unit" insert --until--; line 33, "clocks" should read --clock--; line 57, "converter 24" should read --counter 24--; line 67, "recirculated" should read --recirculate--.

Col. 6, line 5, after "state 1" insert --during the--; line 19, after "unit" insert --is--.

Col. 8, line 25, "disclose" should read --disclosed--; line 54, "0 state o" should read --state o--.

Col. 9, line 1, "A lead 73" should read --Lead 73--; line 33, "writer requests" should read --write requests--.

Col. 10, line 3, "counter" should read --counters--; line 11, "one state of" should read --one state--.

Col. 11, line 14, after "counter" insert --is in the given state and thereafter inhibiting the advance of the address counter--; line 65, "shift" should read --shifting--.

Col. 12, line 67, "first state the" should read --first state after the--.

UNITED STATES PATENT OFFICE
CERTIFICATE OF CORRECTION

Patent No. 3,992,699  Dated November 16, 1976

Inventor(s) Guenter F. Krumbach

It is certified that error appears in the above-identified patent and that said Letters Patent are hereby corrected as shown below:

Column 13, line 48, after "shift" insert -- register --.

Signed and Sealed this

Thirty-first Day of May 1977

[SEAL]

Attest:

RUTH C. MASON
*Attesting Officer*

C. MARSHALL DANN
*Commissioner of Patents and Trademarks*